(12) United States Patent
Barker et al.

(10) Patent No.: US 6,962,270 B1
(45) Date of Patent: Nov. 8, 2005

(54) DOSING VALVE WITH FLOW RATE SENSOR FOR A BEVERAGE DISPENSER

(76) Inventors: Paul Barker, deceased, late of Worcester (GB); by Linda Barker, legal representative, 52 Westbourne Honeybourne, Evesham, Worcester WR11 5PT (GB); Keith James Heyes, 96 Tredington Close, Redditch, Worcestershire B98 7UR (GB); Martin Stanley Johnson, 7 Rupert Kettle Drive, Bishops Itchington, Leamington Spa, Warwickshire CV33 0PU (GB); Steven Maulder, 21 Jubliee Avenue, Redditch, Worcestershire B97 5HB (GB); Phillip Andrew Simmons, 26 Moorfield Road, Alcester, Warwickshire B49 5DA (GB)

( * ) Notice: Subject to any disclaimer, the term of this patent is extended or adjusted under 35 U.S.C. 154(b) by 0 days.

(21) Appl. No.: 09/980,912

(22) PCT Filed: May 5, 2000

(86) PCT No.: PCT/GB00/01732

§ 371 (c)(1),
(2), (4) Date: Jun. 30, 2003

(87) PCT Pub. No.: WO00/68136

PCT Pub. Date: Nov. 16, 2000

(30) Foreign Application Priority Data

May 8, 1999 (GB) .................................... 9910607

(51) Int. Cl.[7] ................................................ B67D 5/56
(52) U.S. Cl. ...................... 222/129.4; 222/63; 222/57; 222/59; 251/122
(58) Field of Search ............................. 222/57, 59, 63, 222/129.1, 129.3–129.4; 137/625.3; 251/122

(56) References Cited

U.S. PATENT DOCUMENTS

| | | | | |
|---|---|---|---|---|
| 4,487,333 A | * | 12/1984 | Pounder et al. | 222/54 |
| 5,011,043 A | * | 4/1991 | Whigham et al. | 222/63 |
| 5,831,176 A | | 11/1998 | Morgenthale et al. | |
| 5,841,027 A | * | 11/1998 | Scarffe | 73/198 |
| 6,092,693 A | * | 7/2000 | Powell | 222/59 |

FOREIGN PATENT DOCUMENTS

| | | | | |
|---|---|---|---|---|
| EP | 0 313 384 | 4/1989 | | |
| GB | 2 298 935 | 9/1996 | | |
| WO | WO 91 17948 | 11/1991 | | |
| WO | WO 9117948 A1 | * 11/1991 | | B67D 1/00 |

* cited by examiner

Primary Examiner—Kenneth Bomberg
(74) Attorney, Agent, or Firm—Pyle & Piontek

(57) ABSTRACT

A beverage dispenser to provide a plurality of different flavors with accurate mixing control comprises a housing (40, 42, 44) containing a diluent valve (46A, 46B) and at least two concentrate valves (48A, B, C, D), each valve having its own inlet (12) and outlet (14), characterized in that all the outlets (14) lead to a single dispense nozzle (50A, B, C), a flow rate sensor (16) is provided for each valve, the flow rate sensors (16) being connected to a controller (54), and a setting mechanism (52A, B, C, D, E, F) is provided to open and close each valve, the controller (54) operating the setting mechanisms whereby one concentrate valve and the diluent valve may be opened to dispense a particular beverage and, in response to the sensed flow rates through those opened valves, controlling the degree of opening of those valves to achieve a predetermined diluent to concentrate ratio for the beverage mixture in the dispense nozzle (50A, B, C).

2 Claims, 2 Drawing Sheets

DOSING VALVE WITH FLOW RATE SENSOR FOR A BEVERAGE DISPENSER

Figure 1:
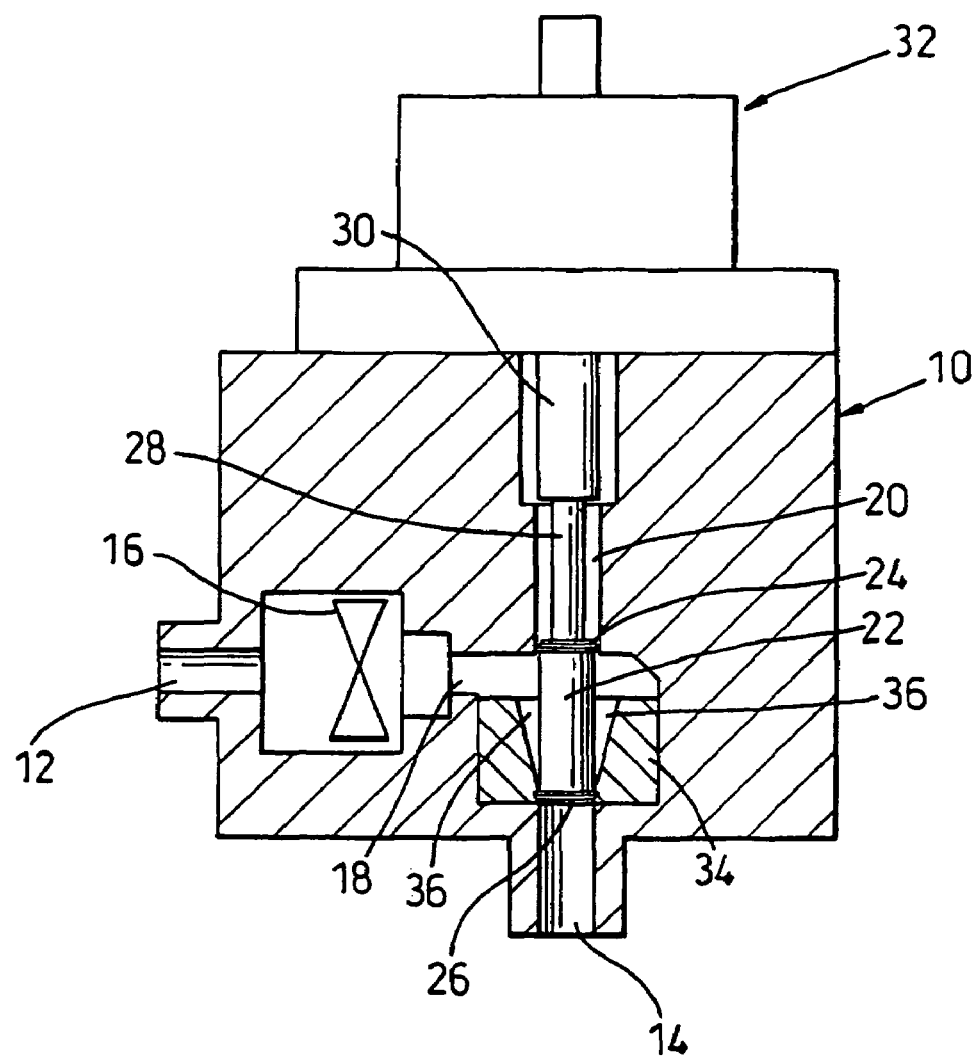

This invention relates to means for the dispensing of beverages. It is particularly concerned with means to provide a plurality of different beverages at a single location.

It is well known to provide beverages by mixing a concentrate, e.g. a fruit syrup, with a diluent, usually plain or carbonated water, at the point of sale and, where it is desired to offer a plurality of different flavours, the equipment required and the control of the necessary mixing can be complicated and expensive.

It is an object of the invention to provide a solution to this problem whereby a plurality of flavours can be offered with accurate mixing control at reasonable equipment cost.

Accordingly, the invention provides a beverage dispenser comprising a housing containing a diluent valve and at least two concentrate valves, each valve having its own inlet and outlet and all the outlets leading to a single dispense nozzle, a flow rate sensor for each valve, the flow rate sensors being connected to a controller, and a setting mechanism to open and close each valve, the control means operating the setting mechanisms whereby one concentrate valve and the diluent valve may be opened to dispense a particular beverage and, in response to the sensed flow rates through those opened valves, controlling the degree of opening of those valves to achieve a predetermined diluent to concentrate ratio for the beverage mixture in the dispense nozzle.

Preferably the housing contains four concentrate valves, each with its own inlet, outlet, flow rate sensor and setting mechanism to open and close the valve.

Preferably the housing contains two diluent valves and the two diluent lines may conveniently be one for plain water and one for carbonated water. Thus in combination with the preferred arrangement of four concentrate valves, a wide range of beverages may be dispensed from the preferred housing.

The housing may conveniently be of a modular design whereby several modules may be grouped together to provide a single dispense unit having, for example, three modules, each providing a wide choice of beverages as described above. These beverages may all be different or some or all may be duplicated whereby two identical beverages may be served at the same time. It will be appreciated, therefore, that the grouping together of appropriate modules can provide considerable flexibility of choice that can be tailored to the needs of a particular sales outlet.

The flow rate sensors may be, for example, flow turbines, and the sensors may measure flow rate directly or by calculation from another property.

The setting mechanisms to set the valves to the desired degree of opening are preferably stepper motors, e.g. of the pulsed, magnetically driven type, but may, for example, be lever mechanisms, proportional solenoid actuators or diaphragm operated mechanisms.

The valves through which the concentrates and diluents pass to reach the dispensing nozzle are preferably of the type described and claimed in our international patent application publication no. WO99/29619. That international application describes and claims a valve comprising a substantially rigid housing containing a passageway between an inlet and an outlet of the valve, a closure member movable in the passageway from a first position in which the valve is fully closed to a second position in which the valve is fully open, the closure member engaging the wall of the passageway to seal the passageway, the wall of the passageway or the closure member defining at least one groove, the groove having a transverse cross-section that increases in area in the downstream or upstream direction, whereby movement of the closure member from the first position towards the second position opens a flow channel through the groove. The groove(s) may be, for example, of tapering V-shape and will, for convenience, hereafter be referred to as "V-grooves" and the valves of this general type as "V-groove valves", although it will be appreciated that the grooves may, if desired, have a different tapering cross-section, e.g. of circular, rectangular or other shape.

The progressive increase or decrease in area of the groove flow channels can produce excellent linear flow through these V-groove valves, i.e. for a given pressure the flow rate is more directly proportional to the valve position than for conventional valves. This enables better control of the flow rate over the entire operating range of the valve.

Moreover, we have found that the V-groove arrangement may lead to reduced carbon dioxide "break out" from carbonated water so that the carbonation level of the dispensed drink remains at a satisfactory level. Thus a valve of this type is particularly beneficial when used in the carbonated water supply of a housing of the invention.

The concentrates, e.g. fruit syrups, are preferably cooled prior to entry to the housing whereas in some conventional arrangements syrup flow is monitored prior to cooling which necessitates less desirable placement of the syrup module, thereby adversely affecting the design of the equipment and its required electronic controls. By monitoring the flow of the cold syrup we can mount the complete syrup module in the housing, e.g. in a tower dispense means, rather than having some of the syrup module housed more remotely adjacent the cooling means.

The controller is preferably an electronic controller, e.g. a microprocessor, and may be programmed to monitor the flow through the valves in one of several ways in order to achieve the full desired beverage mixture ratio at the dispense nozzle. For example, the syrup flow rate may be monitored and used as the "control" rate whereby the water flow rate is then adjusted accordingly. Alternatively, the water flow rate may be monitored and used as the "control" rate and the syrup flow rate adjusted accordingly. In another alternative embodiment, the two aforesaid ways may in effect be combined and both rates used to calculate ratios and either or both flow rates adjusted accordingly.

Figure 2:
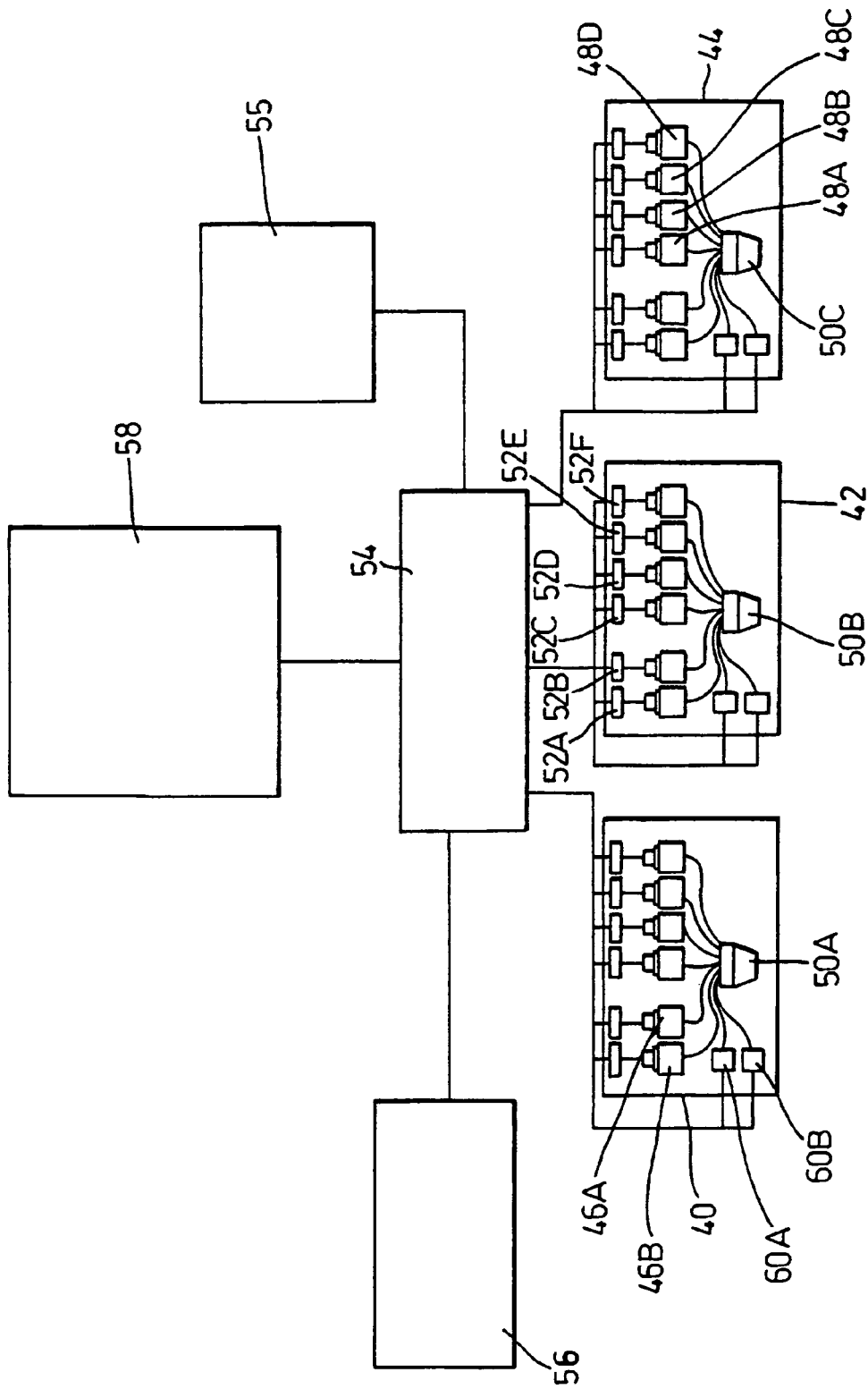

Embodiments of the invention will now be described by way of example only with reference to the accompanying drawings in which:

FIG. 1 is a diagrammatic representation in part section of a valve for use in the invention; and FIG. 2 is a block diagram showing one specific arrangement of the dispense means of the invention.

In FIG. 1 a valve body 10 contains a flow inlet 12 and outlet 14. Liquid flowing through inlet 12 passes via a flow meter turbine 16 and a passageway 18 to meet a central passageway 20 extending through the valve body at right angles to passageway 18. Outlet 14 is a continuation of passageway 20.

A piston 22 extends in passageway 20 and carries at each of its ends a seal 24, 26 to make sealing engagement with the passageway wall. Above seal 24, piston 22 is connected via a smaller diameter connecting rod 28 to the drive shaft 30 of a stepper motor 32.

Between the junction of passageways 18 and 20 and outlet 14, passageway 20 is connected to outlet 14 through the central bore of a valve block 34. The block has a pair of V-grooves 36 diametrically opposed across its central bore and extending axially of the bore. The grooves taper to the outlet end of the bore and commence, i.e. at their wider end, at the far end of the valve block away from the outlet.

When piston 22 is in its lowermost position as shown, it completely closes off in conjunction with its seal 26, the central bore of valve 34, thereby closing outlet 14 and preventing flow through the valve. When the piston is raised by the stepper motor, the valve 34 is opened to allow flow through the V-grooves. The further the piston is raised the greater the degree of opening through the grooves.

In FIG. 2 is shown a three module assembly in which each module 40, 42, 44 contains two valves 46A, 46B for water, one carbonated and one plain, and four valves 48A, 48B, 48C, 48D for syrups. Each valve in a module outlets to a single dispense nozzle 50A, 50B or 50C. (The three modules are identical so that, for clarity, not all parts of each module are labelled.).

Each valve, 46A, 46B, 48A, 48B, 48C, 48D is similar in construction to the valve body described with reference to FIG. 1. Thus each valve contains a flow meter turbine and is connected to a stepper motor 52A, 52B, 52C, 52D, 52E, 52F to open and close the valve. Each stepper motor and each flow meter is connected to the pre-programmed control board 54. The system is powered by a 24 volts A.C. PSU 55. Other inputs to the control board 54 include an installation means 56 to input data such as flow rates, dispensed portion volumes and water/syrup ratios. This may be achieved by a wire connection or a remote, e.g. infra red, means. A control panel 58 may include selection switches or press buttons for particular beverages, e.g. by brand name, portion sizes, choice of still or carbonated water and, if desired, a free flow option as an alternative to predetermined portions.

If it is desired to add further flavourings or essences to the dispensed beverages the modules are shown to contain two optional essence valves 60A, 60B whose opening and closing are also controlled by board 54.

The dispenser is advantageously designed whereby it consumes energy only when the stepper motors are actually moving so that the arrangement can enable more valves to be controlled for a given power supply.

What is claimed is:

1. A multiple fluid mixture dispensing device for mixing one or more of a plurality of liquid concentrates with one or more liquid diluents, the multiple mixture fluid dispensing device, comprising:

two or more concentrate flow control valves, each concentrate valve for controlling flow of a concentrate liquid in a downstream direction from an inlet to an outlet thereof, one or more diluent flow control valves, each for controlling flow of a diluent liquid in a downstream direction from an inlet to an outlet thereof, each concentrate and diluent valve having a housing body defining a flow passage extending therethrough from the inlet thereof to the outlet thereof, and the flow passage having a flow control portion defined by a flow orifice, flow orifice sidewalls, and one or more grooves formed in the flow orifice sidewalls, and the one or more grooves having a cross-sectional area that decreases in a downstream direction along the flow orifice sidewalls, a rod extending through the housing and into and substantially coextensive with the flow passage and the rod linearly moveable by a linear drive means, and the rod having a distal end portion opposite from the linear drive means for insertion into the flow orifice and the rod distal end portion having exterior sidewalls sized to lie closely adjacent the flow orifice sidewalls and the distal end portion for cooperating with a seat means positioned downstream of the flow passage control portion to prevent liquid flow through the flow passage when the rod is moved to a fully extended position by the linear drive means and the rod also moveable thereby to a fully retracted position for permitting maximum liquid flow and the linear drive means for holding the rod distal end portion at a plurality of positions along the one or more grooves for regulating the flow rate of the liquid as a function of the cross-sectional area of the one or more grooves, the outlets of the two or more concentrate valves and of the one or more diluent valves extending to a common nozzle.

2. The device as defined in claim 1, and the two or more concentrate control valves and the one or more diluent control valves comprising a common module.

* * * * *